Oct. 10, 1944.  G. F. KEELERIC  2,359,920
ABRASIVE ARTICLE
Filed Dec. 23, 1943
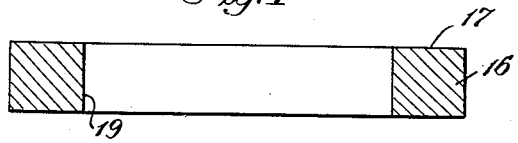
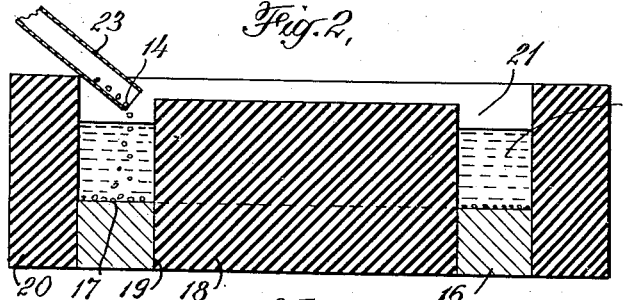 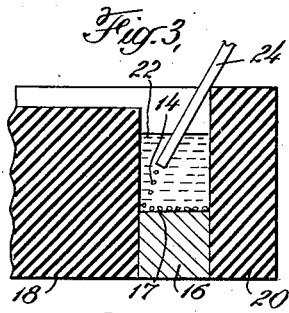
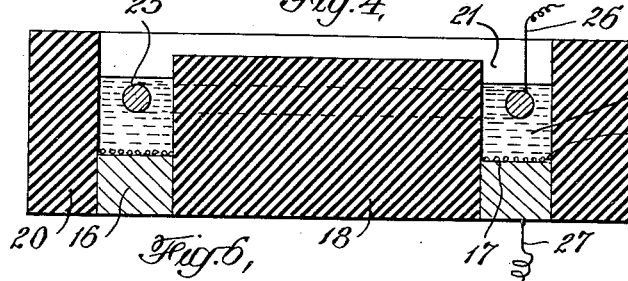 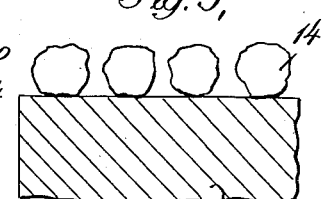
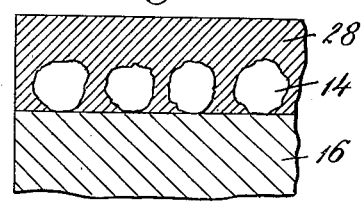 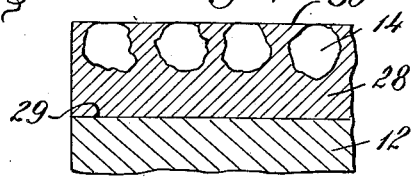
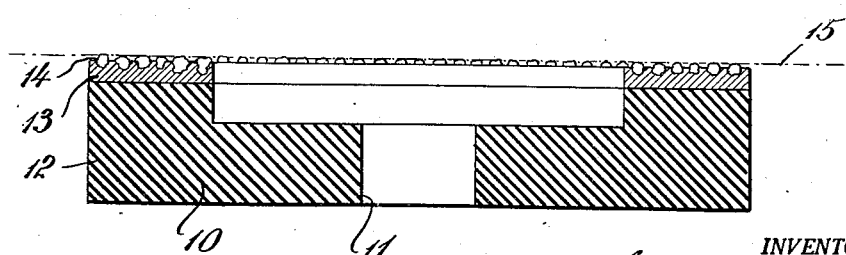
INVENTOR.
George F. Keeleric
BY
ATTORNEYS Patented Oct. 10, 1944

2,359,920

UNITED STATES PATENT OFFICE 2,359,920

ABRASIVE ARTICLE

George F. Keeleric, Westboro, Mass.

Application December 23, 1943, Serial No. 515,397

6 Claims. (Cl. 51—309)

This invention relates to abrasive tools employed for cutting and grinding purposes and including a base or body having a thin superficial layer of abrasive particles on its working surface. The tools with which the invention is concerned are disclosed and claimed in my co-pending application Serial No. 491,827, filed June 22, 1943, and are characterized in that the particles, which are partially embedded and anchored in a layer of bonding metal, have their outermost portions projecting from the layer all lying in a grinding surface. More particularly, the invention has to do with a novel method by which the tools of the prior application can be easily and economically made.

In the practice of the new method, use is made of a blank having a surface of the shape and size of the working surface that the tool is to have. On this surface of the blank are deposited the abrasive particles in any desired distribution and, thereafter, bonding material is applied to the surface to build up a layer which encloses the particles. The bonding metal may be applied in various ways, as, for example, by spraying or by electrodeposition, the latter procedure being preferred. After the layer of bonding metal has been built up to the desired thickness with the abrasive particles embedded therein, it is secured to a tool body, with the face of the layer formerly in contact with the blank outermost. The body may be made of plastic material by a molding operation with the layer, still mounted on the blank, serving as part of the mold, or the layer may be removed from the blank and affixed to a preformed body in any suitable manner. After the layer of bonding material with the particles therein has been applied to the tool body, sufficient of the bonding metal is removed to expose the particles to the desired extent.

For a better understanding of the invention, reference may be had to the accompanying drawing in which Fig. 1 is a view in transverse section of a blank used in making one type of abrasive tool in accordance with the method of the invention;

Fig. 2 is a sectional view showing the assembly of parts used in practicing one step in the process;

Fig. 3 is a fragmentary view similar to Fig. 2 showing a modified operation;

Fig. 4 is a view similar to Fig. 2 showing the parts at a succeeding stage in the operation;

Fig. 5 is a sectional view through a portion of the blank showing the relation of the particles thereto at one stage in the operation;

Fig. 6 is a view similar to Fig. 5 showing the application of the bonding metal to the blank;

Fig. 7 is a fragmentary sectional view showing the application of the bonding layer, with the particles embedded therein, to a tool body; and Fig. 8 is a sectional view of an abrasive wheel made by the practice of the invention.

The method of the invention may be used for making tools of various sorts, but since the method may be efficiently employed in the production of abrasive wheels of the side cutting type, the application of the method to the manufacture of such wheels will be explained with reference to the drawing.

Side cutting wheels have various constructions and that illustrated in Fig. 8 includes a body or base 10 of suitable material, such as metal or plastic, the body or base being of circular section and provided with a central opening 11 by which the tool may be mounted on a shaft. The body is provided with a peripheral flange 12 projecting from one face and a layer 13 of bonding metal, in which are partially embedded abrasive particles 14, is secured to the outer surface of the flange. In the drawing, these particles are shown in exaggerated size for purposes of clarity. In such a wheel produced by the new method, the outermost portions of the particles projecting from the layer of bonding metal all lie in a plane surface, indicated by the dotted line 15, and this surface may be referred to as the grinding surface. Since all of the particles have portions lying in the grinding surface, the particles all take part simultaneously in the grinding operation and this insures that the wheel will perform its functions efficiently.

In the production of the wheel 19 by the new method, there is first formed a blank 16 which is provided with a surface 17 of the same shape and size as the surface of the flange 12 on which the abrasive particles are to be mounted. The blank may be made of any suitable material and is preferably formed of steel. The surface 17 of the blank is to have a layer of abrasive particles distributed thereon and bonding metal deposited around the particles to enclose them. The application of the bonding metal can be performed in various ways, as, for example, the metal may be sprayed on the particles distributed on the blank in the desired arrangement. The application of the bonding metal by electrodeposition is preferred, however, and, for this purpose, a quantity of electrolyte is confined in contact with the surface 17. A suitable procedure involves inserting a plug 18 of non-conductive material into the central opening 19 of the blank, the plug being made of rubber or like material, since it is easy to obtain a tight fit with such a plug. A ring 20 of similar material is then placed to enclose the blank and the ring, blank, and plug then define an annular chamber 21 into which is introduced a quantity of electrolyte 22 which contains the bonding metal and may be a solution of a salt of the metal. After introduction of the electrolyte into the chamber, the abrasive particles are deposited on the surface 17 of the blank and, for this purpose, the particles 14 may be distributed by means of a tube 23 on the surface of the electrolyte. The particles then fall through the electrolyte and come to rest on the surface 17 of the blank in the desired distribution. If preferred, the particles may be discharged through a small tube 24, the end of which lies beneath the electrolyte.

The particles employed for the purpose may be any of the usual abrasive particles employed in abrasive tools, but diamond dust of appropriate mesh is preferred.

After the particles have been deposited on the top surface of the blank, an annular anode 25 is introduced into the chamber 21 and supported beneath the level of the electrolyte in the chamber. The anode is connected through a line 26 to a source of current and the blank 16 is likewise connected to the source through a line 27. In the event that the blank is made of non-metallic material and only its surface is electroconductive, the line 27 will be connected to that surface. With the anode in position, current is supplied thereto and metal from the electrolyte is deposited on the surface 17 of the blank and the deposit 28 is built up until it extends above the tops of the particles, that is, beyond the portions of the particles most remote from the blank. The deposited layer then completely encloses the particles, except for the portions thereof lying in contact with the surface of the blank.

After completion of the layer, the anode and the electrolyte are removed from the cell formed by the plug, the ring, and the blank, and the parts of the cell are then disassembled. The layer 28 is next to be secured to a tool body and such a body may be formed by being molded in contact with the layer or may be preformed. If the body is to be molded, it is preferably made of a plastic material and it is formed by the procedure described in detail in my copending application Serial No. 491,827, filed June 22, 1943. According to the method of that application, the blank 16, with the layer in place, is utilized as part of a mold into which plastic material is introduced and shaped under heat and pressure to final form. Throughout the molding operation, the layer 28 remains on the blank 16, so that it is supported thereby and warping of the layer during the application of heat and pressure to the plastic material is prevented.

If the tool body is preformed, the layer 28 is removed from the blank 16 and it is then secured to the body in any appropriate manner, as by means of a suitable adhesive.

In the tool, the surface 29 of layer 28, which is in contact with the tool body, is the surface opposite to that formerly in contact with the blank 16 and the abrasive particles 14, accordingly, lie with portions in the outermost surface 30 of the layer. After the layer has been secured to the tool body, a sufficient amount of bonding metal is removed from the surface 30 of the layer to provide the desired exposure of the particles in the working surface of the tool. The removal of the bonding metal may be effected in various ways, as by dissolving it away with acid or by electrolytic action.

When the layer of bonding metal with the abrasive particles therein is to be secured to a tool body made of a plastic material molded to final form in contact with the layer, the layer may be relatively thin, provided it is not stripped from the surface of the blank until after the molding operation is completed. If a preformed tool body is to be used, it may be necessary to machine or otherwise finish the surface 29 of the layer before the layer is secured to the body and, in that event, the layer is built up to greater thickness to facilitate the machining.

Tools made by the practice of the new method are characterized in that all the particles have portions lying in the grinding surface and such tools operate with excellent efficiency. The production of tools of the type by the new method is simple and inexpensive and requires only simple equipment.

I claim:

1. A method of making a tool having a body formed with a working surface provided with a superficial layer of abrasive particles embedded in a bonding metal which comprises distributing abrasive particles upon a surface of a blank, maintaining said particles wholly upon and in direct contact with the surface of the blank while applying bonding metal upon said particles and directly upon the surface of the blank about them to cause said particles to become bonded in a solidified homogeneous body of metal extending outwardly from said surface of the blank beyond the edges of the particles most remote from the surface of the blank, and securing a tool base to the side of the body of metal opposite that in contact with the blank, while said body of metal still is in contact with the blank, so that the edges of the particles which were in contact with the surface of the blank lie in the working surface of the tool, and separating the tool base and attached body of bonding metal from the blank.

2. A method of making a tool having a body formed with a working surface provided with a thin superficial layer of abrasive particles embedded in a bonding metal which comprises distributing abrasive particles upon a surface of a blank corresponding to the desired working surface of the tool to be made, maintaining said particles wholly upon and in direct contact with the surface of the blank while applying bonding metal upon said particles and upon the surface of the blank about them to cause said particles to become bonded in a solidified homogeneous body of metal extending outwardly from said surface of the blank beyond the edges of the particles most remote from the surface of the blank, securing a tool base to the side of the body of metal opposite that in contact with the blank, while said body of metal still is in contact with the blank so that the edges of the particles which were in contact with the surface of the blank lie in the working surface of the tool, separating the tool base and attached body of metal from the blank, and removing sufficient of the bonding metal from about the particles, at the working face, to expose portions of the particles.

3. A method of making a tool having a body formed with a working surface provided with a thin superficial layer of abrasive particles embedded in a bonding metal which comprises confining an electrolyte containing the bonding metal in contact with an electroconductive surface of the blank, which surface has the shape and size of the working surface of the tool to be made, distributing abrasive particles upon the surface of the electrolyte above the surface of the blank, said particles falling through the electrolyte to land upon said surface of the blank, electrodepositing the bonding metal upon the surface of the blank about the particles until said particles became bonded in a homogeneous body of metal extending outwardly from said surface of the blank beyond the edges of the particles most remote from the said surface of the blank, securing a tool base to the side of the bonding metal which is beyond said particles, so that the edges of the particles which were in contact with the surface of the blank lie in the working surface of the tool, and separating the tool base and attached body of bonding metal from the blank.

4. A method of making a tool having a body formed with a working surface provided with a thin superficial layer of abrasive particles embedded in a bonding metal which comprises confining an electrolyte containing the bonding metal in contact with an electroconductive surface of a blank, which surface has the shape and size of the working surface of the tool to be made, discharging abrasive particles beneath the surface of the electrolyte to fall through the electrolyte and land upon said surface of the blank, electrodepositing the bonding metal upon the surface of the blank about the particles until said particles become bonded in a homogeneous body of metal extending outwardly from said surface of the blank beyond the edges of the particles most remote from the said surface of the blank, securing a tool base to the side of the bonded metal which is beyond said particles, so that the edges of the particles which were in contact with the surface of the blank lie in the working surface of the tool, and separating the tool base and attached body of bonding metal from the blank.

5. A method of making a tool having a body formed with a working surface provided with a thin superficial layer of abrasive particles embedded in a bonding metal which comprises confining an electrolyte containing the bonding metal in contact with an electroconductive surface of a blank, which surface has the shape and size of the working surface of the tool to be made, distributing abrasive particles upon said surface of the blank beneath the electrolyte, electrodepositing the bonding metal upon the surface of the blank about the particles until said particles become bonded in a homogeneous body of metal extending outwardly from said surface of the blank beyond the edges of the particles most remote from the said surface of the blank, securing a tool base to the side of the body of metal opposite that in contact with the blank, while said body of metal still is in contact with the blank so that the edges of the particles which were in contact with the surface of the blank lie in the working surface of the tool, and separating the tool base and attached body of bonding metal from the blank.

6. A method of making a tool having a body formed with a working surface provided with a thin superficial layer of abrasive particles embedded in a bonding metal which comprises confining an electrolyte containing the bonding metal in contact with an electroconductive surface of a blank, which surface has the shape and size of the working surface of the tool to be made, distributing abrasive particles upon said surface of the blank beneath the electrolyte, electrodepositing the bonding metal upon the surface of the blank about the particles until said particles become bonded in a homogeneous body of metal extending outwardly from said surface of the blank beyond the edges of the particles most remote from the said surface of the blank, securing a tool base to the side of the body of metal opposite that in contact with the blank, while said body of metal still is in contact with the blank so that the edges of the particles which were in contact with the surface of the blank lie in the working surface of the tool, separating the tool base and attached body of bonding metal from the blank, and removing sufficient of the bonding metal from around the portions of the particles which were in contact with the blank to expose portions of the particles.

GEORGE F. KEELERIC.